(12) United States Patent
Jordan et al.

(10) Patent No.: US 11,945,680 B1
(45) Date of Patent: Apr. 2, 2024

(54) SPOOL-SUPPORTING PALLET AND METHOD OF USE

(71) Applicants: David S. Jordan, Knoxville, TN (US); Michael C. Jordan, Knoxville, TN (US); Scott M. Jordan, Knoxville, TN (US)

(72) Inventors: David S. Jordan, Knoxville, TN (US); Michael C. Jordan, Knoxville, TN (US); Scott M. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 518 days.

(21) Appl. No.: 16/974,072

(22) Filed: Sep. 21, 2020

(51) Int. Cl.
| | | |
|---|---|---|
| B65H 75/24 | (2006.01) | |
| B65D 19/00 | (2006.01) | |
| B65D 19/06 | (2006.01) | |
| B65D 19/38 | (2006.01) | |
| B65D 85/04 | (2006.01) | |
| B65H 49/32 | (2006.01) | |
| B65H 49/38 | (2006.01) | |
| B66F 3/10 | (2006.01) | |

(Continued)

(52) U.S. Cl.
CPC ......... *B65H 75/24* (2013.01); *B65D 19/0002* (2013.01); *B65D 19/06* (2013.01); *B65D 19/385* (2013.01); *B65D 85/04* (2013.01); *B65H 49/325* (2013.01); *B65H 49/38* (2013.01); *B66F 3/10* (2013.01); *B66F 9/12* (2013.01); *B66F 9/18* (2013.01); *H02G 1/081* (2013.01); *B65H 49/32* (2013.01); *B65H 2701/30* (2013.01); *B65H 2701/50* (2013.01); *H02G 1/08* (2013.01); *Y10S 414/124* (2013.01)

(58) Field of Classification Search
CPC ........ H02G 1/081; H02G 1/08; B65H 49/325; B65H 49/38
See application file for complete search history.

(56) References Cited

U.S. PATENT DOCUMENTS

| | | | | |
|---|---|---|---|---|
| 4,762,291 A | * | 8/1988 | Sauber | .................... B60P 3/035 |
| | | | | 242/561 |
| 6,073,916 A | * | 6/2000 | Plummer | ............... B65H 51/10 |
| | | | | 254/134.3 R |

(Continued)

OTHER PUBLICATIONS

IToolCo Reel Pallet Jack RPJ10K (Year: 2021).*

(Continued)

*Primary Examiner* — Mahdi H Nejad
(74) *Attorney, Agent, or Firm* — Michael E. McKee

(57) ABSTRACT

A pallet and method for supporting a spool for transport or use includes an elongated frame having two opposite ends and two opposite sides which extend between the two opposite ends. The frame includes a support surface within which a spool can be cradled so that the spool rests across the support surface and the barrel of the item is oriented substantially horizontally and normal to the longitudinal axis of the frame. A pair of cooperating members are arranged adjacent the sides of the frame and are cooperable with the spool barrel for placing a spool in condition to be lifted from the support surface. Jack assemblies are interposed between the cooperating members and the frame for lifting the spool from the support surface by way of the jack assemblies.

8 Claims, 11 Drawing Sheets

(51) Int. Cl.
    *B66F 9/12*          (2006.01)
    *B66F 9/18*          (2006.01)
    *H02G 1/08*         (2006.01)

(56) References Cited

U.S. PATENT DOCUMENTS

| | | | |
|---|---|---|---|
| 9,884,738 B1* | 2/2018 | Arce | B65H 49/24 |
| 9,975,727 B1* | 5/2018 | Jordan | B65H 49/34 |
| 10,272,935 B1* | 4/2019 | Jordan | B65H 49/325 |
| 11,034,372 B1* | 6/2021 | Jordan | B62B 5/0003 |
| 11,235,944 B1* | 2/2022 | Jordan | B65H 75/08 |
| 11,643,297 B1* | 5/2023 | Graham | B65H 54/44 |
| | | | 242/557 |
| 2014/0117143 A1* | 5/2014 | Jordan | B65H 49/38 |
| | | | 242/557 |
| 2014/0319302 A1* | 10/2014 | Baltz | B65D 19/385 |
| | | | 248/346.02 |
| 2017/0190536 A1* | 7/2017 | Worton | B65H 49/205 |

OTHER PUBLICATIONS

ITOOLco's Real Pallet Jack Product Video found at: https://www.youtube.com/watch?v=E844YMx0lf8&t=19s (Year: 2021).*
Stand For Supporting Reel, Especially Cable Reel; Document ID: DE 19536722 A1; Date Published: Apr. 3, 1997; Inventor Name: Werz Dieter, Voegele Gerhard, Bossert Gerhard; Date Filed: Sep. 30, 1995 (Year: 1997).*

* cited by examiner

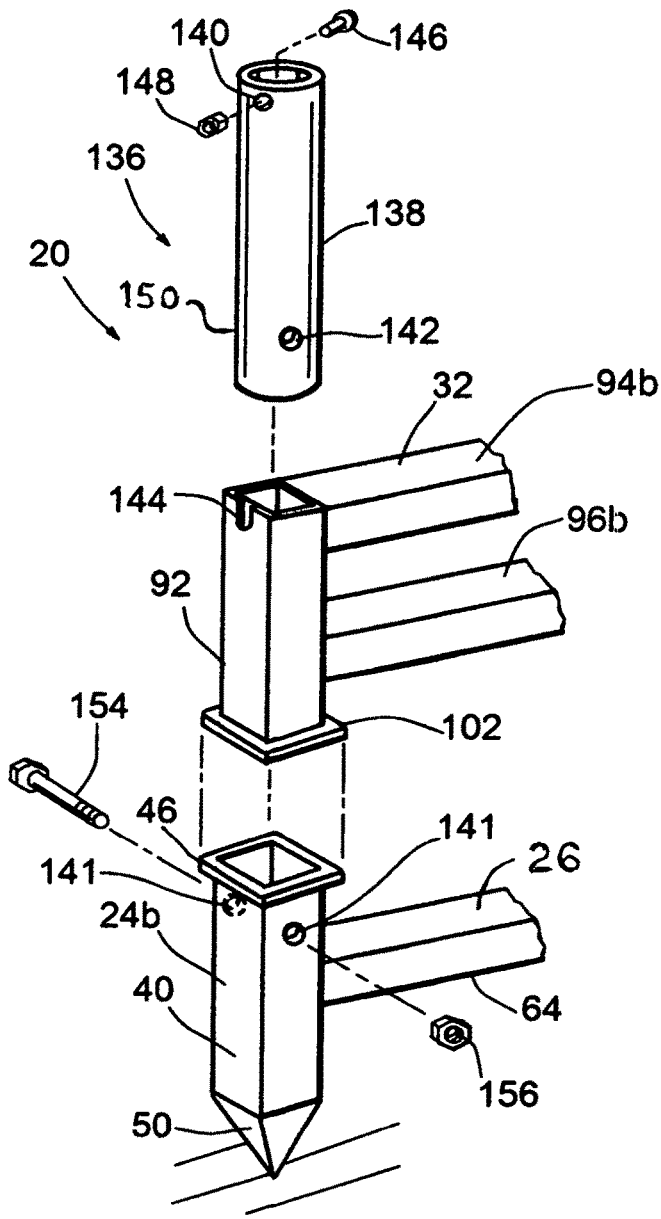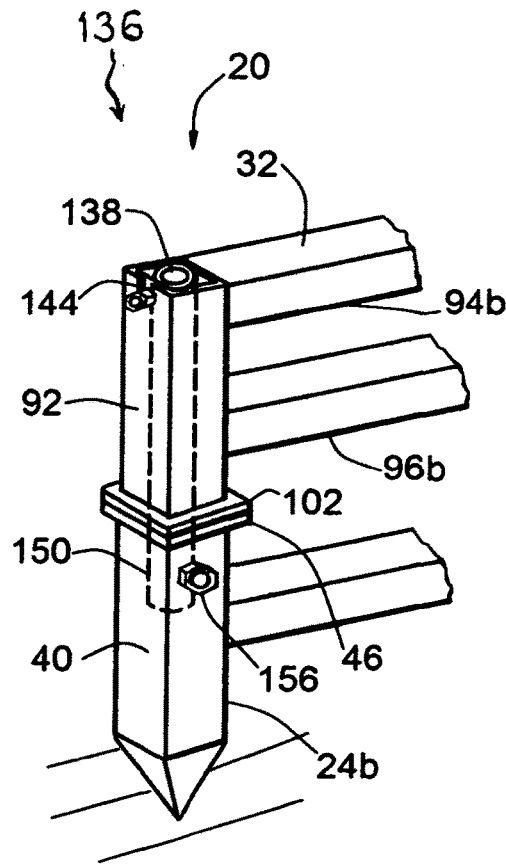
FIG.10
FIG.11

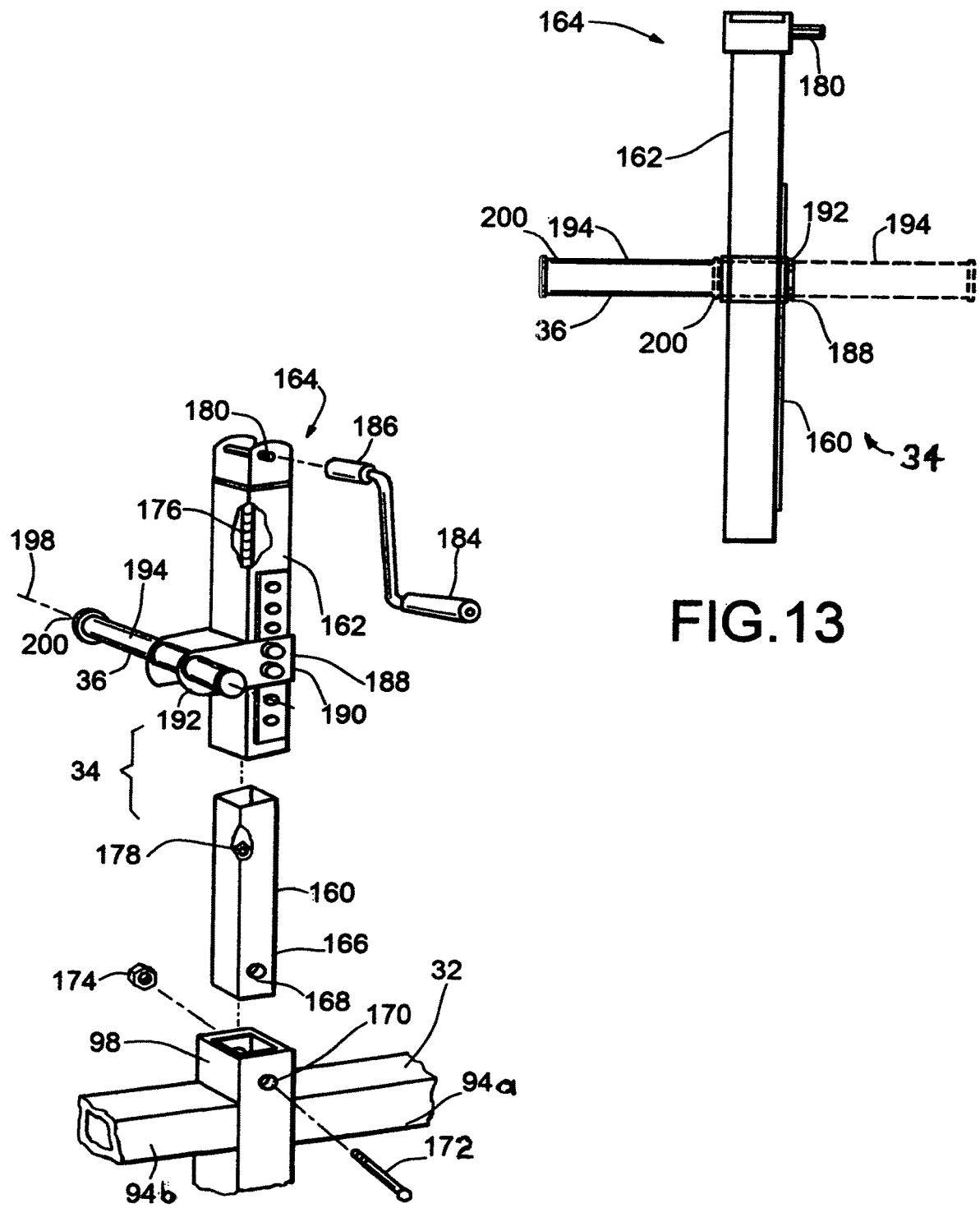

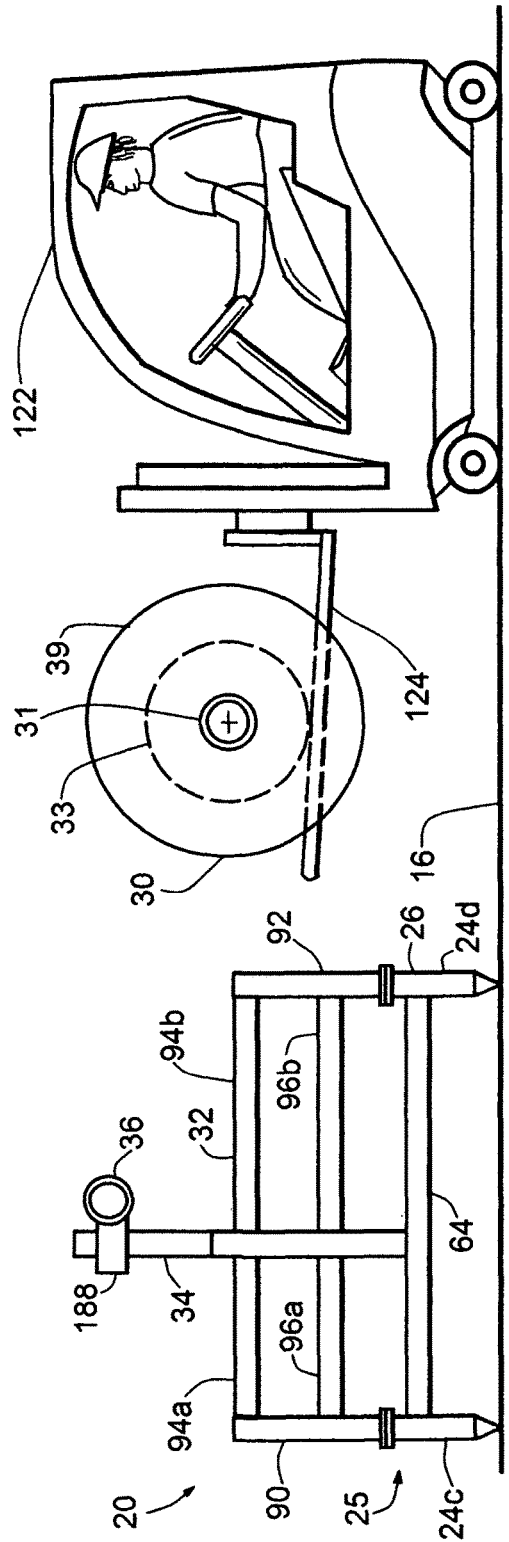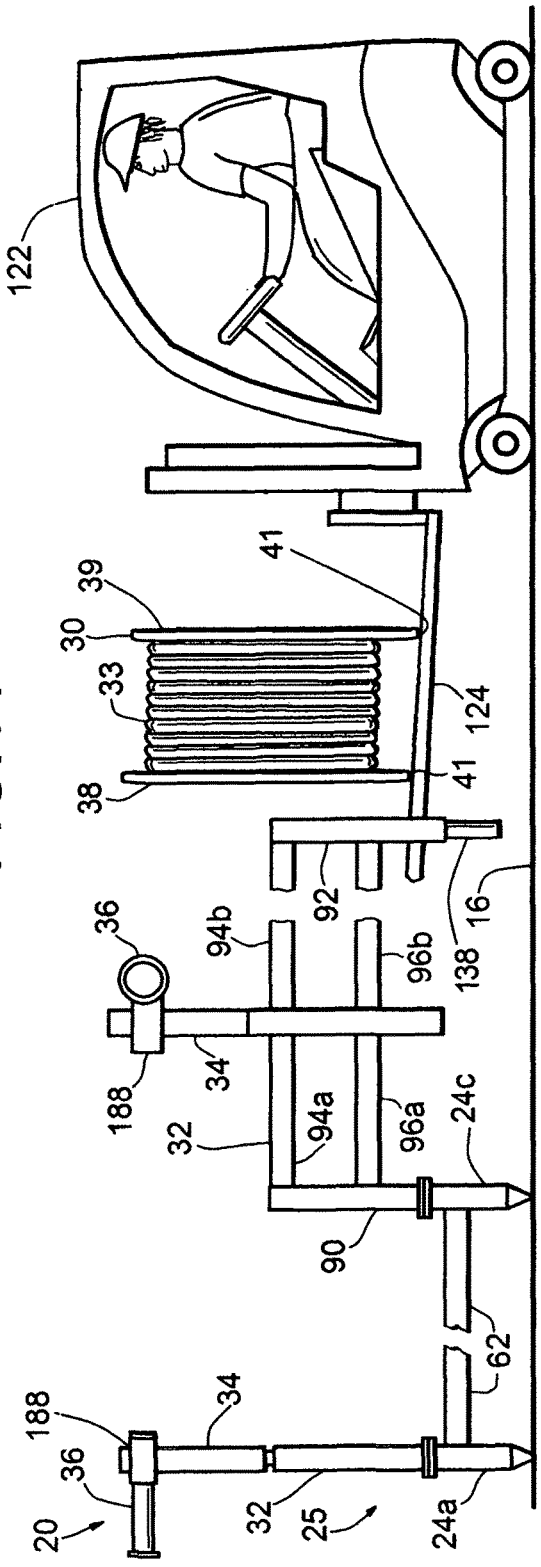

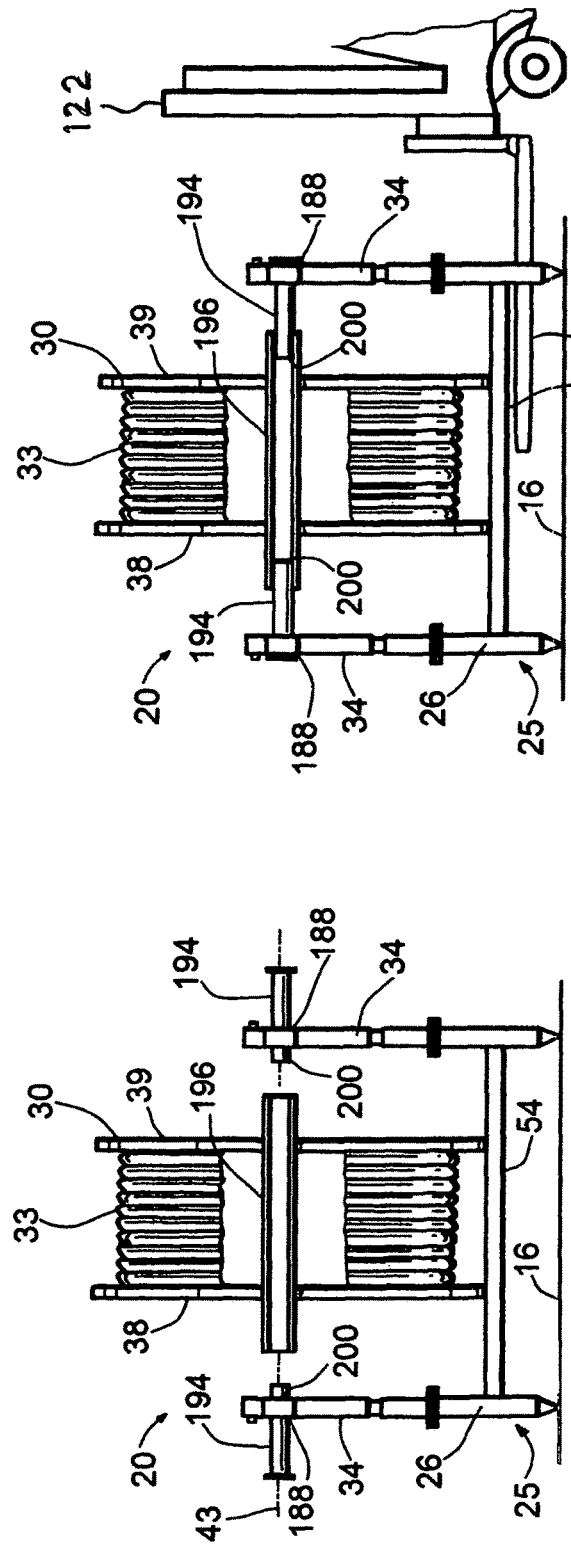
FIG.16
FIG.17
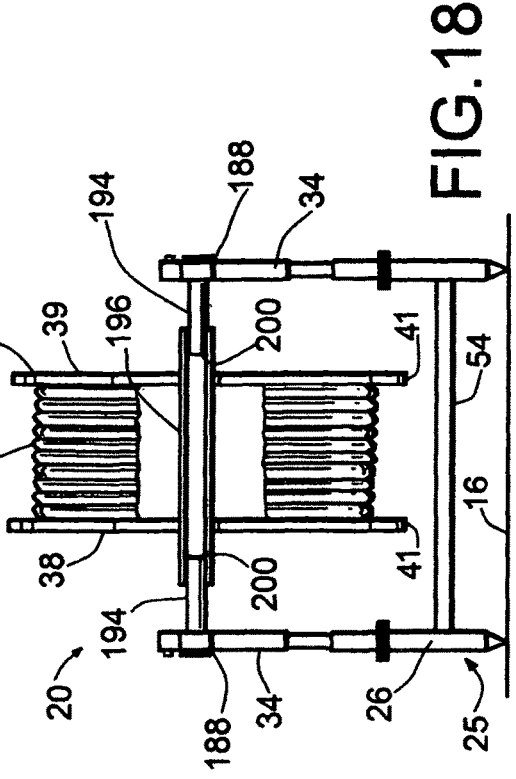
FIG.18

SPOOL-SUPPORTING PALLET AND METHOD OF USE

BACKGROUND OF THE INVENTION

This invention relates generally to means and methods for supporting an item for transport from one site to another and relates, more particularly, to an apparatus which is well-suited for supporting an item, such as spool, for holding windable material above an underlying floor for the purpose of supporting the item above the floor while the windable material is unwound from the spool and an associated method of use.

An item, such as a spool, for holding windable material, such as electrical wire or cable, and which is capable of being lifted and supported by an accessory of the class with which this invention is concerned commonly includes a hollow barrel about which a length of windable material can be wound or from which a windable material can be unwound.

It would be desirable to provide a new and improved apparatus for supporting such an item of the aforedescribed class above an underlying floor for transport or storage purposes and which is capable of lifting and holding the item in an elevated condition while material is unwound from the item.

Accordingly, it is an object of the present invention to provide a new and improved apparatus for supporting an item of the aforedescribed class above a floor and which is capable of lifting and supporting the item in an elevated condition for purposes of unwinding material from the item and an associated method of using the apparatus.

Another object of the present invention is to provide such an apparatus which facilitates the transport of the item from one site to another as the apparatus, with the item supported thereby, is moved from one site to another.

Another object of the present invention is to provide such an apparatus which is adapted to alter the height, or distance, that the item is supported from an underlying floor.

Still another object of the present invention is to provide such an apparatus having a frame upon which the item can be placed and which includes means for lifting the item from the frame to accommodate the rotation of the item during a material unwinding process.

Yet another object of the present invention is to provide such an apparatus which is capable of being stacked with an apparatus of like construction for storage purposes.

A further object of the present invention is to provide such an apparatus which embodies a jack assembly to facilitate the lifting of the item from the frame of the apparatus.

A still further object of the present invention is to provide such an apparatus having an elongated frame upon which the item can be placed wherein the frame can be approached from either an end of the frame or from a side thereof.

A yet further object of the present invention is to provide such an apparatus which is uncomplicated in structure, yet effective in operation.

SUMMARY OF THE INVENTION

This invention resides in a spool-supporting pallet for supporting a spool for holding windable material wherein the spool includes an elongated barrel having two opposite ends and about which the material is wound and from which the material can be unwound.

The pallet includes an elongated frame having two opposite ends and a longitudinal axis and two opposite sides which extend between the two opposite ends of the frame. The frame includes a support surface within which a spool can be cradled so that when cradled within the frame, the spool is arranged so that the barrel of the spool is oriented substantially horizontally and normal to the longitudinal axis of the frame. In addition, a cooperating member is mounted upon the frame adjacent one side thereof, and the cooperating member is cooperable with the barrel of a spool at one of the two opposite ends of the barrel so that when the spool is cradled upon the support surface as aforesaid and the cooperating member is positioned in cooperating relationship with one of the two opposite ends of the barrel of the spool, said one barrel end is in condition to be lifted from the support surface with the cooperating member. Furthermore, a jack assembly is interposed between the cooperating member and the frame for raising the cooperating member with respect to the frame so that after positioning the cooperating member in cooperating relationship with one end of the barrel of the spool cradled upon the support surface as aforesaid, said one end of the spool can be lifted from the support surface of the frame by way of the jack assembly.

The method of the invention includes the steps involved in using the pallet of the invention. In particular, such steps include the providing of the pallet of the invention, the positioning of the spool in a cradled condition within the support surface of the frame, the positioning of the cooperating member in cooperating relationship with an end of the barrel of the spool and then lifting the cooperating member upwardly from the frame so that the spool is lifted from the cradled condition within the frame.

BRIEF DESCRIPTION OF THE DRAWINGS

FIG. 10 is a perspective view of another fragment of the FIG. 1 pallet, shown exploded.

FIG. 11 is a perspective view of the FIG. 10 fragment of the FIG. 1 pallet, shown assembled.

FIG. 12 is a perspective view of one of the jack assemblies of the FIG. 1 pallet, shown exploded and having portions cut-away.

FIG. 13 is an elevation view of a fragment of the jack assembly of FIG. 12 as viewed generally from the left in FIG. 12.

FIG. 14 is an elevation view depicting the loading of a spool upon the FIG. 1 pallet from an end thereof.

FIG. 15 is an elevation view depicting the loading of a spool upon the FIG. 1 pallet from a side thereof.

FIGS. 16-18 are front elevation views of a spool being supported by the FIG. 1 pallet and depicting the sequential steps involved in lifting the spool from its supported, or cradled, condition within the base of the pallet.

DETAILED DESCRIPTION OF ILLUSTRATIVE EMBODIMENTS

Figure 1:
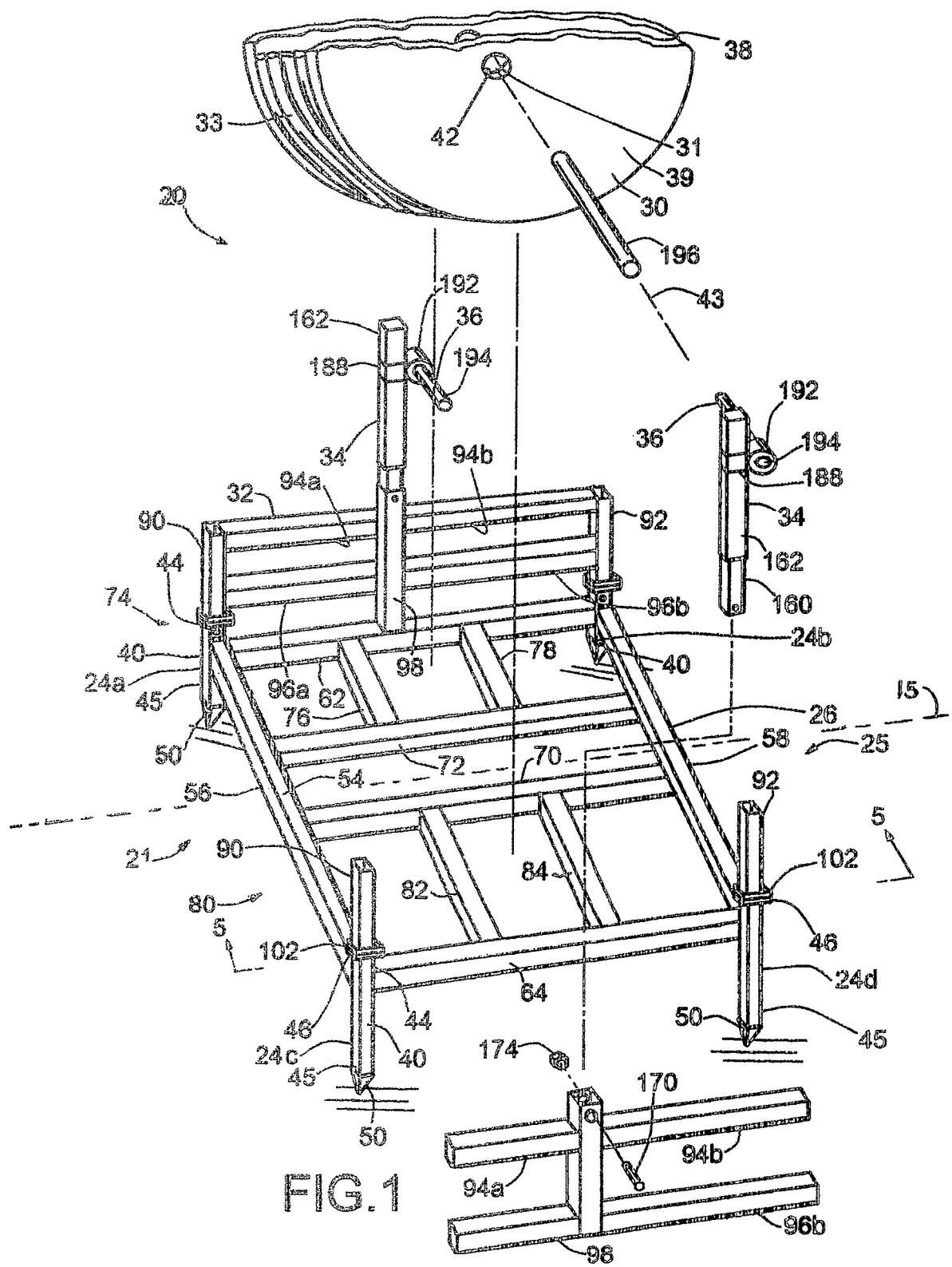
FIG. 1 is a perspective view of an embodiment of a pallet apparatus, shown exploded, within which features of the present invention are embodied and a spool which is capable of being positioned upon the pallet in a cradled condition therein.

Turning now to the drawings in greater detail and considering first FIG. 1, there is illustrated an embodiment, generally indicated 20, of a pallet apparatus within which features of the present invention are embodied. Briefly, the pallet 20 includes a floor-engaging base 22 having four vertically-disposed legs 24a, 24b, 24c and 24d and a substantially planar frame 26 which is supported by the legs 24a, 24b, 24c and 24d in a substantially horizontal orientation. The frame 26 is comprised of an arrangement, generally indicated 21, of elongated rail members, described herein, which provide a support means, or surface, generally indicated 25, upon which a spool 30 is cradled when the spool 30 is positioned upon the frame 26.

In addition, the pallet 20 is provided with a pair of identical side rail assemblies 32 which are each connectable to a corresponding pair of legs 24a, 24b or 24c, 24d, and there is associated with each rail assembly 32 a jack assembly 34 and a cooperating member 36 for cooperating with a spool 30 positioned upon the frame 26 in a cradled condition therein so that the spool 30 can be lifted upwardly relative to the frame 26 (by way of the jack assemblies 34) from a cradled condition of rest to an elevated position above the support surface 25 so that the spool 30 is permitted to rotate (or be rotated) with respect to the frame 26. For example and when lifted to its elevated position, the spool 30 is in a condition which permits the spool 30 to be rotated during an operation which unwinds windable material from the spool 30.

Figure 2:
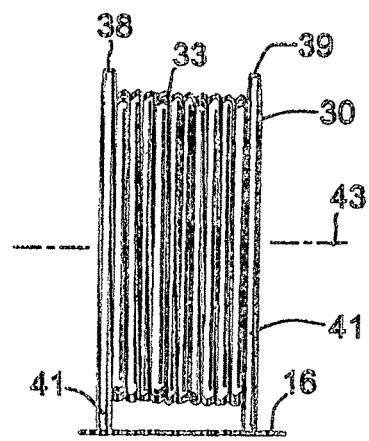
FIG. 2 is a front elevation view of an exemplary spool of windable material of a class which is capable of being positioned upon the FIG. 1 pallet.
Figure 3:
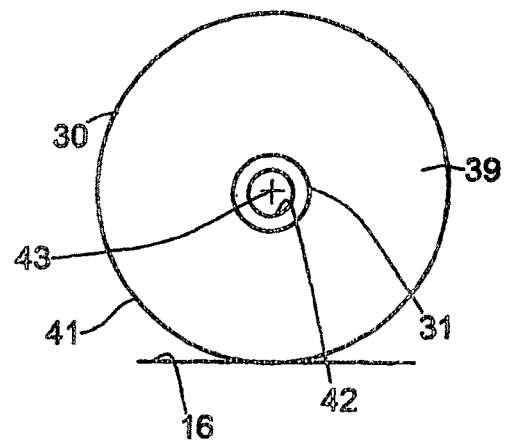
FIG. 3 is a side elevation view of the FIG. 2 spool.

With reference to FIGS. 1-3, there is illustrated a spool 30 of a class of spools which can be positioned upon and subsequently lifted by the components of the depicted pallet 20. More specifically, the depicted spool 30 of FIGS. 1-3 includes a hollow, elongated barrel 31 about which a length of windable (e.g. coilable) material 33, such as electrical wire, steel cable, or rope, is wound and includes a pair of planar discs 38, 39 attached to the opposite ends of the barrel 31. Each disc 38 or 39 of the depicted spool 30 is circular in form and defines a cylindrical rim 41 along its peripheral edge. Furthermore, there is commonly provided a hollow bore 42 which extends through the center of both discs 38 or 39 and the elongated barrel 31. In addition, each of the barrel 31 and the bore 42 has an elongated axis 43 about which the spool 30 can be rotated (e.g. for purposes of unwinding material 33 from the barrel 31 of the spool 30) as the spool 30 is supported above the support surface 25 of the frame 26 by way of the jack assemblies 34, 34.

Although the depicted spool 30 includes discs 38, 39 at the opposite ends of the spool 30, an item capable of being positioned upon a frame of a pallet apparatus embodying features of the present invention need not possess such end discs. For example, spools of wound material, such as a roll of sheet steel, may not posses such discs at the opposite ends thereof yet still be capable of being positioned upon a frame of a pallet apparatus constructed in accordance with the broader aspects of the present invention. Accordingly, the principles of the present invention can be variously applied.

Figure 4:
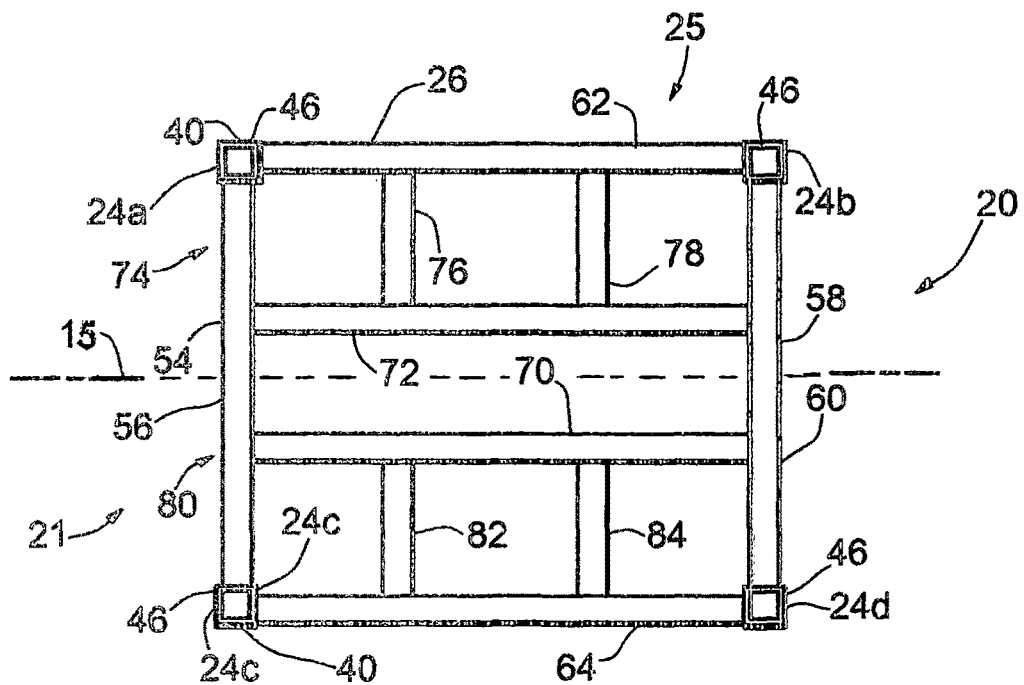
FIG. 4 is a plan view of the base of the FIG. 1 pallet.
Figure 6:
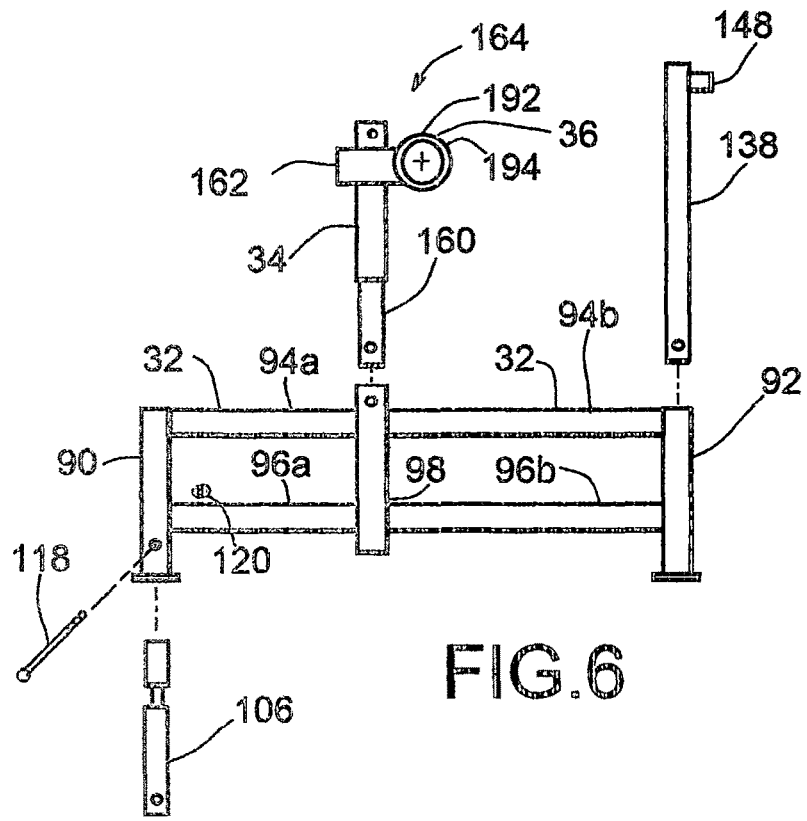
FIG. 6 is a side elevation view of a rail assembly of the FIG. 1 pallet, shown exploded.

With reference to FIGS. 1 and 4, each leg 24a, 24b, 24c or 24d of the base 22 of the pallet 20 includes a vertically-disposed section 40 of substantially square cross section and having upper and lower ends 44, 45, respectively. Surrounding the upper end 44 of the section 40 is an outwardly-extending flange 46 having an upwardly-facing surface, and protruding downwardly from the lower end 45 of the section 40 is a foot 50 having somewhat pyramidical shape which tapers downwardly to a floor-engaging point. The vertically-disposed section 40 is hollow along its length for a reason which will be apparent herein.

As best shown in FIG. 4, the aforementioned arrangement 21 of rail members of the frame 26 includes a first elongated rail member 54 which is joined (as with welds) at its opposite ends to two legs 24a and 24c disposed adjacent one end, indicated 56, of the frame 26, a second elongated end rail member 58 which is joined (as with welds) at its opposite ends to the remaining two legs 24b and 24d disposed adjacent the other end, indicated 60, of the frame 26, and a pair of side rails 62, 64 which are each joined (as with welds) at its opposite ends to and extend between a corresponding pair of legs 24a, 24b or legs 24c, 24d disposed along the sides of the frame 26. The arrangement 21 of rail members of the frame 26 also includes a pair of intermediate rails 70, 72 which are arranged substantially parallel to one another and to the longitudinal axis, indicated 15, of the frame 26 and are joined (as with welds) at the opposite ends thereof to the first and second rail members 54 and 58.

As mentioned earlier, the frame 26 provides a support surface 25 upon which a spool 30 is cradled when the spool 30 is positioned upon, or within, the frame 26. Within the elongated frame 26, the support surface 25 is defined by a first set, generally indicated 74, of elongated and parallel struts 76, 78 which are joined between the side rail 62 and the intermediate rail 72 at locations disposed between the ends 56, 60 of the frame 36, and a second set, generally indicated 80, of elongated and parallel struts 82, 84 which are joined between the side rail 64 and the intermediate rail 70 at locations disposed between the ends 56, 60 of the frame 26. Preferably, the strut 76 of the first set 74 of struts is axially aligned with the strut 82 of the second set 80 of struts, and the strut 78 of the first set 74 of struts is axially aligned with the strut 84 of the second set 80 of struts.

Figure 5:
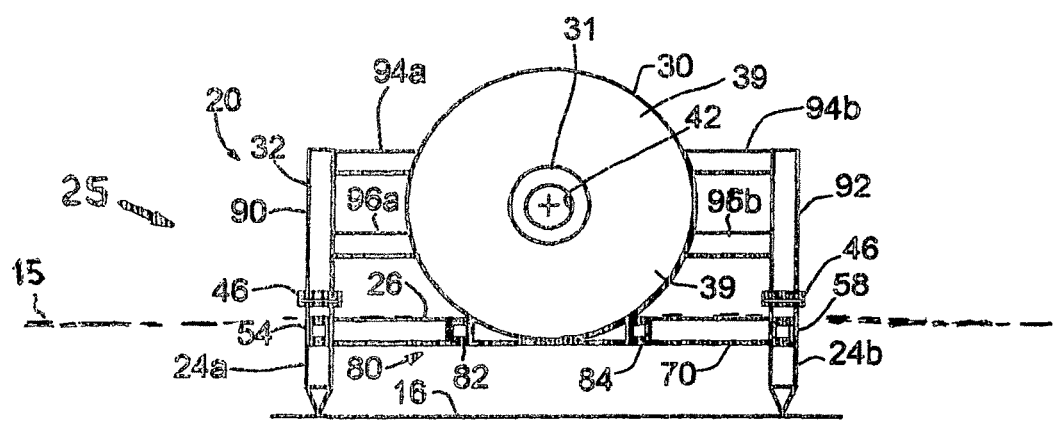
FIG. 5 is a longitudinal cross-sectional view of the pallet of FIG. 1 taken about along line 5-5 of FIG. 1 and showing the spool of FIG. 2 being cradled within the base of the FIG. 1 pallet.

As exemplified by the struts 82, 84 of the second set 80 of struts 82, 84 and as depicted in FIG. 5, the upper surfaces of each set 74 or 80 of struts provides a cradle support across which, or within which, a corresponding disc 38 or 39 of a spool 30 is adapted to rest when the spool 30 is positioned upon the frame 26 in a cradled condition therein. In particular and when the spool 30 is cradled across the sets 74, 80 of struts, the cylindrical rim 41 of each disc 38 or 39 of the spool 30 lies across and engages both struts 76, 78 or 82, 84 of a corresponding set 74 or 80 of struts. Accordingly, the struts of each of the first and second set 74 or 80 are spaced apart by a sufficient distance so that when a spool 30 is placed across the frame 26 so that the longitudinal axis 43 of the spool bore 42 is arranged substantially parallel to the struts of the first and second set 74, 80 (and thus substantially normal to the longitudinal axis 15 of the frame 26), the discs 38, 39 lie in a stable condition across the struts of the first and second sets 74, 80 and in a substantially vertical orientation.

To position a spool 30 upon the frame 26 to the cradled position illustrated in FIG. 5, a spool 30 whose rims 41 rest upon the underlying floor 16 (such as is depicted in FIG. 2 or 3), can be lifted by the forks, indicated 124 in FIG. 14, or a forklift truck 122 (FIG. 14) as the forklift truck 122 is directed toward the front or rear of the spool 30 in order to maneuver the forklift forks 124 beneath the coil 33 of wire or cable wound about the barrel 31 of the spool 30. The spool 30 is then lifted from the underlying floor 16 as the forks 124 bear directly upwardly against the coils 33, and the spool 30 is thereafter positioned across the frame 26 so that the center of the discs 38, 39 of the spool 30 are arranged in vertical registry with (about) the center of the gaps, or spacings, defined between the struts of each set 74 or 80 of struts as the forklift truck 122 approaches the frame 26 from either end of the frame 26. Such an advance of the spool 30 toward the frame 26 from an end thereof is depicted in FIG. 14. When the spool 30 is positioned in vertical registry with the sets 74, 80 of struts as aforedescribed, the spool 30 can be lowered onto the sets 74, 80 of struts to the cradled condition illustrated in FIG. 5.

However and as will be explained hereinafter, the pallet 20 permits a user to position a spool 30 into a cradled condition across, or within, the sets 74, 80 of struts as the pallet 20 is approached with a spool 30 from a side (i.e. either side) of the frame 26. That is to say, the spool 30 can be lifted by the forks 124 of a forklift truck 122 (FIG. 15) as the forks 124 are directed beneath the spool discs 38, 39 so that when the forks 124 are subsequently lifted by the truck 122, the forks 124 bear upwardly against the rims 41 of the discs 38, 39, rather than upwardly against the coils 33. With the spool 30 thus lifted by the forklift truck 122, the center of the spool 30 can be maneuvered into vertical registry with the center of the gaps defined between the struts of each set 74 or 80 of struts as the spool 30 is advanced across the frame 26 from a side thereof. Such an advance of the spool 30 toward the frame 26 from a side thereof is depicted in FIG. 15. This spool-lifting scheme (as depicted in FIG. 15) in which the forklift forks 124 bear upwardly against the rims 41 of the discs 38, 39 may be preferred over the earlier-described spool-lifting scheme (depicted in FIG. 14) in which the forklift forks 124 bear upwardly against the coil 33 of material wound about the spool barrel 31 to reduce any likelihood that the coil 33 will be damaged by the forklift forks 124 during a spool-lifting process performed by the forklift 122.

Figure 7:
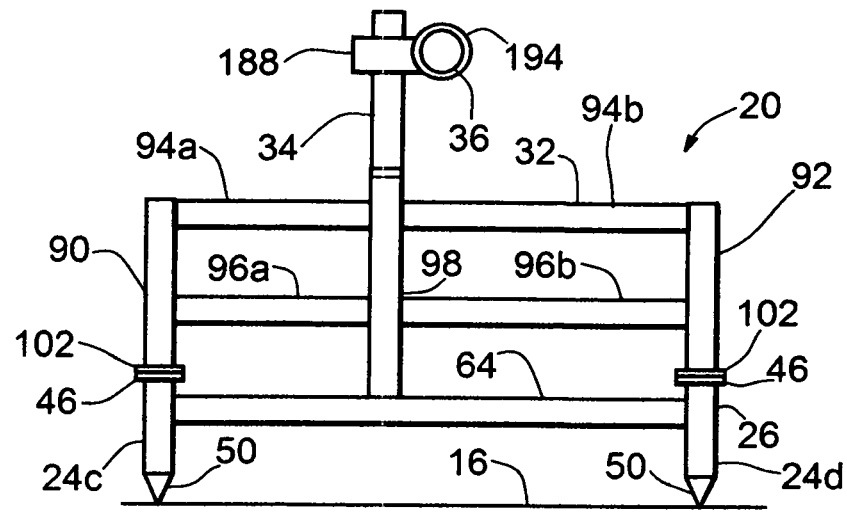
FIG. 7 is a side elevation view of the base of the FIG. 1 pallet shown with the rail assemblies positioned thereon.
Figure 8:
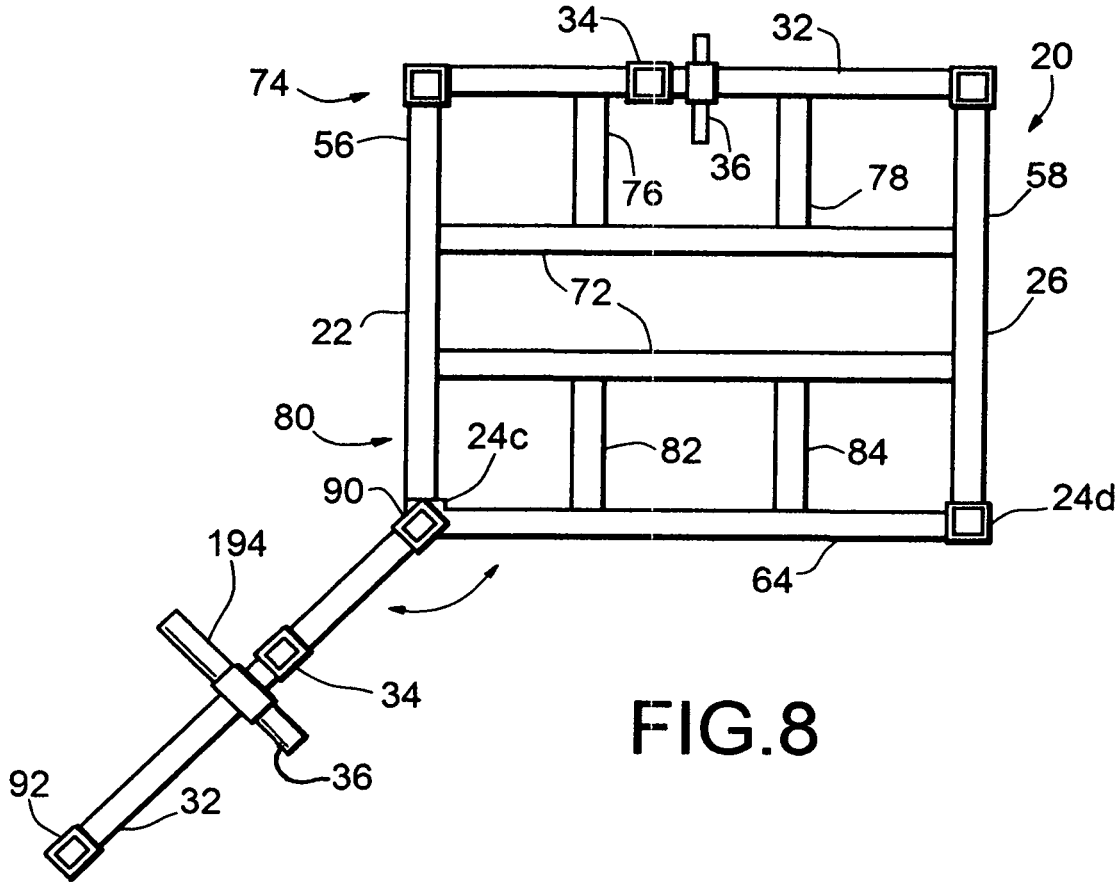
FIG. 8 is a plan view, as seen from above, of the FIG. 1 pallet, but showing one of its rail assemblies pivoted to a secondary, or out-of-the-way, condition.

At any rate and to provide access to the support surface 25 of the frame 26 from a side (i.e. either side) thereof, each rail assembly 34 of the pallet 20 is capable of being pivoted moved relative to the frame 26 from a first, or closed, condition as illustrated in FIG. 7 at which each rail assembly 34 is disposed directly above a corresponding side of the frame 26 (and so that the tubular end sections 90, 92 of each rail assembly 32 are positioned in vertical registry with a corresponding set of legs 24a, 24b or 24c, 24d) and a second, or out-of-the-way, condition as depicted in FIG. 8 at which the rail assembly 32 cannot obstruct access to the frame 26 from one side thereof. In other words and when the rail assembly 34 is disposed in its FIG. 8 out-of-the-way condition, access can be had to the spool-bearing sets 74, 80 of the struts of the frame 26 as a forklift-supported spool 30 (supported in the manner depicted in FIG. 15) approaches the frame 26 from one side thereof.

It follows that in addition to the function served by the side rail assemblies 32 (i.e. to support the jack assemblies 34 adjacent the discs 38, 39 of a spool 30 cradled upon the frame 26 as illustrated in FIG. 5), the side rail assemblies 32 serve the additional function of providing a user with the option of positioning a forklift-supported spool 30 upon, or within, the frame 26 as the forklift-supported spool 30 is advanced toward the frame 26 from one side thereof, as is depicted in FIG. 15.

In connection with the foregoing and with reference to FIGS. 1 and 6-9, each side rail assembly 32 includes a pair of vertically-disposed hollow tubular end sections 90, 92 and a pair of horizontally-oriented aligned upper rail sections 94a, 94b which extend between and are joined to the end sections 90, 92, and a pair of horizontally-oriented aligned lower rail sections 96a, 96b which extend between and are joined to the end sections 90, 92. In addition, a vertically-disposed tubular section 98 is joined intermediate the upper and lower rail sections 94a, 94b and 96a, 96b for supporting a corresponding jack assembly 34.

Figure 9:
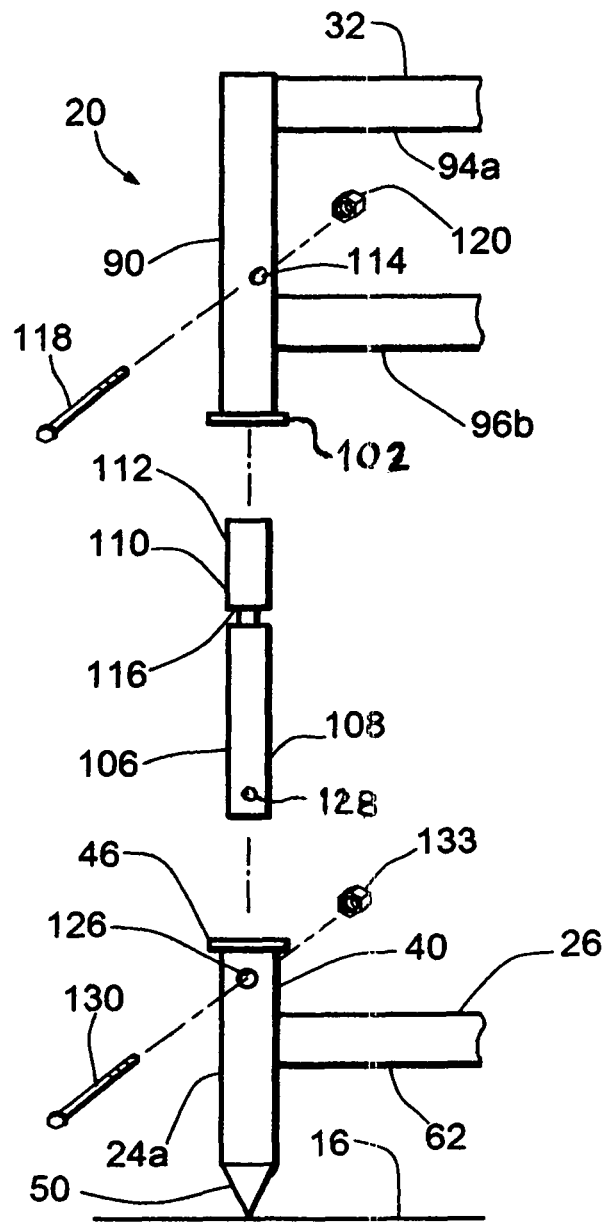
FIG. 9 is an elevation view of a fragment of the FIG. 1 pallet as seen in FIG. 7, shown exploded and drawn to a slightly larger scale.

As exemplified by the tubular end section 90 of the rail assembly 32 depicted in FIG. 9, each tubular end section 90 of 92 includes an outwardly-extending flange 102 at the lower end thereof, and each side rail assembly 32 is arrangeable atop the legs 24a, 24b, 24c, 24d of the base 22, as shown in FIGS. 1, 7 and 9, so that the tubular sections 90, 92 are vertically-aligned with the legs 24a, 24b or 24c, 24d of the base 22 adjacent a corresponding side of the frame 26. In particular and as shown in FIG. 1, the tubular sections 90, 92 of the rail assembly 32 which is disposed along one side of the frame 26 are vertically aligned with the legs 24a and 24b, and the tubular sections 90, 92 of the rail assembly 32 which are disposed along the other side of the frame 26 are vertically aligned with the legs 24c and 24d. With the rail assemblies 32 arranged in such a manner, the flanges 102 of the tubular end sections 90, 92 rest atop the upper surface of the flanges 46 of the legs 24a, 24b, 24c and 24d.

To facilitate the pivotal movement of each rail assembly 32 between the first, or closed, condition as illustrated in FIG. 7 and the second, or out-of-the-way, condition as illustrated in FIG. 8—and as exemplified by the rail assembly 32 shown in FIG. 9, the pallet 20 includes a cylindrical member 106 having an upper section 110 which is accepted by and pinned within (in a manner described herein) the hollow interior of the tubular end section 90 and a lower section 108 which extends downwardly of the flange 102 and into the hollow interior of a leg section 40 when the cylindrical member 106 is pinned within the tubular end section 90. With the cylindrical member 106 thus positioned within both the tubular end section 90 and the leg section 40, the cylindrical member 106 is in condition to act as a pivot pin about which a corresponding rail assembly 32 can be pivoted relative to a corresponding leg 24a or 24c between the FIG. 7 closed condition and the FIG. 8 out-of-the-way condition.

For releasably securing the cylindrical member 106 in place within the vertically-disposed tubular end section 90, there is provided within the tubular end section 90 a set of horizontally aligned through-openings 114 (only one shown in FIG. 9) disposed adjacent one side of the section 90, and the cylindrical member 106 defines an annular groove 116 disposed intermediate of the upper and lower sections 110, 108 of the member 106. By directing the upper section 108 of the cylindrical member 126 upwardly into the hollow interior of the tubular end section 90 so that the annular groove 116 is aligned with the set of through-openings 114, the shank of a headed fastener 118 can be directed through the aligned through-openings 114 and grove 116 to pin the cylindrical member 106 in a fixed position along the length of the tubular end section 90. The headed fastener 118, in turn, is securable through the aligned through-openings 114 and groove 116 with a nut 120 threaded upon the end of the shank of the fastener 118 opposite the head end thereof.

It will be understood that with the cylindrical member 106 secured along the length of the tubular end section 90 as aforedescribed, the lower section 108 of the cylindrical member 106 extends downwardly below the horizontal level of the flange 102 and into the vertically-disposed section 40 of the leg 24a. It will also be understood that the (other) rail assembly 32 disposed on the other, or opposite, side of the frame 26 includes identical components to those depicted in FIG. 9 for pivotally joining the (other) rail assembly 32 to the vertically-disposed section 40 of the leg 24c (FIG. 1).

To releasably secure the lower section 108 of the cylindrical member 106 to the leg 24a (and thereby prevent the withdrawal of the cylindrical member 106 from the section 40 of the leg 24a), the vertically-disposed section 40 of the leg 24a defines a set of horizontally-aligned through-openings 126 (only one shown in FIG. 9) and the lower end of the cylindrical member 106 is provided with a horizontally-disposed opening 128. When the lower section 108 of the cylindrical member 106 (which is pinned within the tubular section 92 as aforedescribed) is lowered into position within the vertically-disposed section 40 of the leg 24a, the opening 128 of the cylindrical member 106 is alignable with the through-openings 126 of the section 40, and the shank of a headed fastener 130 can be directed through the aligned openings 126, 128 to pin the cylindrical member 108 to the leg 24a. The headed fastener 130, in turn, is securable through the aligned through-openings 126, 128 with a nut 133 threaded upon the end of the shank of the fastener 130 opposite the head end thereof.

With reference to FIGS. 10 and 11 and as exemplified by the rail assembly 32 whose tubular end section 92 is arranged in vertical registry with the leg 24b of the frame 26, each rail assembly 32 includes means, generally indicated 136, for releasably securing the tubular end section 92 to the leg 24b (or 24d) so that, when desired, the rail assembly 32 remains in its FIG. 7 closed condition. To this end, the securing means 136 includes a hollow cylindrical tubular member 138 which is capable of being slidably inserted (e.g. downwardly) within the hollow interior of the tubular end section 92 of the rail assembly 32 and having a first opening 140 in a side thereof and which is positioned adjacent the upper end thereof and a second set of aligned through-openings 142 (only one shown in FIG. 10) which is disposed adjacent the lower end of the cylindrical member 138. In addition, an upwardly-opening notch 144 is formed along an upper edge of the tubular end section 92, and a headed fastener 146 is secured, as with a nut 148, within the first opening 140 formed within the cylindrical member 138. When assembled, the tubular section 92 slidably accepts the cylindrical member 138 directed downwardly therein through the upper end thereof until the nut 148 (which is associated with the fastener 146) rests within the notch 144 of the tubular end section 92. In addition, the vertically-disposed section 40 of the leg 24b of the frame 26 defines a set of horizontally-aligned through-openings 141 whose purpose will be apparent herein.

With the nut 148 resting within the notch 144 (and the cylindrical member 138 thereby fully accepted by the tubular end section 92), the lower section, indicated 150 in FIG. 10, of the cylindrical member 138 is accepted by the hollow interior of the vertically-disposed section 40 of the leg 24a to thereby prevent the tubular end section 92 from moving or shifting laterally of the frame 26 and with respect to the leg 24a thereof. In addition, when the cylindrical member 138 is fully accepted by the leg 24a (and the nut 148 rests within the notch 144), the set of through-openings 141 provided within the vertically-disposed section 140 of the leg 24b are aligned with the set of through-openings 142 provided along the length of the cylindrical member 138. The shank of a headed fastener 154 can be directed through the aligned through-openings 141 and 142 to prevent the withdrawal of the cylindrical member 138 from the leg 24a. The headed fastener 154, in turn, is securable through the aligned through-openings 141 and 142 with a nut 156 threaded upon the end of the shank of the fastener 154 opposite the head end thereof.

It will be understood that the (other) rail assembly 32 disposed on the other, or opposite, side of the frame 26 includes identical components to those depicted in FIG. 10 for releasably securing the (other) rail assembly 32 of the frame 26 to the vertically-disposed section 40 of the leg 24d (FIG. 1).

It follows from the foregoing that when the securing means 136, with its cylindrical member 138 in an assembled condition within the rail assembly 32 so that the lower section 150 of the cylindrical member 138 is accepted by the hollow interior of the vertically-disposed section 40 of the leg 24b and is secured along the length of the leg 24b with the fastener 154, the tubular end section 92 cannot be moved from its position, as illustrated in FIG. 11, at which the tubular end section 92 is disposed in vertical registry with the leg 24b upon which the tubular end section 92 rests. With the tubular end section 92 thereby secured upon the leg 24b, the rail assembly 32 is prevented from being pivoted about the cylindrical member 106 (FIG. 9) disposed at the opposite end of the rail assembly 32.

It also follows that in order to release the rail assembly 32 from the leg 24b—and thereby permit the rail assembly 32 to be pivoted relative to the frame 26 toward the FIG. 8 out-of-the-way condition, the fastener 154 is removed from the aligned sets of through-openings 141 and 142 and the cylindrical tubular member 138 is raised (i.e. manually) along the length of the tubular end section 42 until the lower section 150 of the cylindrical member 138 is elevated above (so as to clear) the flange 46 of the leg 24b. With the cylindrical member 138 thereby raised above the flange 46, the rail assembly 32 can be pivoted, to the extent needed, about the cylindrical member 106 (FIG. 9) disposed at the opposite end of the rail assembly 32. If desired and upon pivoting the tubular end section 92 of the rail assembly 32 out of vertical registry with the leg 24b, the cylindrical member 138 can be released from its raised condition and thereby permit the cylindrical member 138 to be lowered to its lowermost position at which the nut 148 returns to a position of rest within the notch 144.

As exemplified by the jack assembly 34 of FIGS. 12 and 13, each jack assembly 34 includes telescoping inner and outer tube sections 160 and 162, respectively, wherein the inner tube section 160 is connected in a fixed relationship with the intermediate tubular section 98 of a corresponding rail assembly 32 and wherein the outer tube section 162 is permitted to be raised or lowered with respect to the frame 26 by way of jack apparatus, generally indicated 164, associated with the jack assembly 34 and interposed between the inner and outer tube sections 160 and 162.

In this connection, the inner tube section 160 has a lower end portion 166 through which a set of through-openings 168 (only one shown in FIG. 12) are defined, and the intermediate tubular section 98 of the associated rail assembly 32 defines a set of through-openings 170 (only one shown in FIG. 12) adjacent the upper end thereof. To join the jack assembly 34 to the associated rail assembly 32, the inner tube section 160 is inserted downwardly into the hollow interior of the intermediate tubular section 90 (which is sized to closely accept the inner tube section 160 directed endwise downwardly therein) so that the sets of through-openings 168 and 170 are aligned with one another, and the shank of a headed fastener 172 is directed through the sets of through-openings 168 and 170. The fastener 172 is, in turn, secured through the aligned through-openings 168, 170 with a nut 174 which is threaded about the end of the shank of the fastener 170 opposite the head end thereof. It follows that with the jack assembly 34 joined to the intermediate tubular section 90 of the rail assembly 32 in such a manner, the inner tube section 160 is fixedly secured to a corresponding rail assembly 32 and extends upwardly therefrom in a substantially vertical orientation.

As best shown in FIG. 12, the jack apparatus 164 includes a threaded screw 176 which is rotatably mounted within the outer tube section 162 and is threadably accepted by an internally-threaded stud 178 fixedly mounted within the inner tube section 160. In addition, the jack apparatus 164 includes gear mechanisms, including a rotatable drive shaft 180, mounted adjacent the upper end of the outer tube section 162, which are associated with the outer tube section 162 for converting, in a known manner, (forced) rotation of the drive shaft 180 about a horizontal axis of rotation to rotation of the screw 176 about a substantially vertical axis (and within the stud 178) for moving the outer tube section 162 either upwardly or downwardly along the length of the inner tube section 160 depending upon the direction in which the drive shaft 180 is rotated about its horizontally-disposed axis. The jack apparatus 164 also includes a handle 184 having a drive shaft-accepting socket 186 for rotating (e.g. manually) the drive shaft 180 about its horizontal axis of rotation.

As suggested earlier, each cooperating member 36 is supported by a corresponding jack assembly 32 for movement upwardly or downwardly relative to the frame 26 by way of the jack assembly 34. To this end, the pallet 20 includes a carriage assembly 188 having a collar section 190 which is fixedly secured (at a fixed location) about the upper tube section 162 and further includes a bearing-including arbor 192 within which the cooperating member 36 can be rotated with respect to the carriage assembly 188 about a horizontally-disposed axis. Although the cooperating members 36 can take any of a number of forms, each cooperating member 36 of the depicted pallet 20 is in the form of a cylindrically-shaped spindle 194 which is mounted within the arbor 192 for rotation therein about the longitudinal axis, indicated 198, of the spindle 194 and which is sized to be accepted by an end of the barrel 31 of a spool 30 cradled upon the support surface 25 of the frame 26 or, as will be apparent herein, by an end of a tube 196 (FIGS. 16-18) which is positionable through the barrel 31 of a spool 30 cradled upon the frame support surface 25.

It is also a feature of the cooperating member 36 that it is mounted within the arbor 192 for sliding movement with respect thereto along the longitudinal axis 198 of the spindle 194. In particular, the spindle 194 is mounted within the arbor 192 for sliding movement with respect thereto between an extended position as depicted in solid lines in FIG. 13 at which the spindle end, indicated 200, extends over and across a portion of the frame 26 from one side of the jack assembly 34 (i.e. is disposed inboard of the pallet 20) and a retracted position as depicted in phantom in FIG. 13 at which the spindle end 200 is withdrawn from its FIG. 13 (or inboard position) at which it extends across the frame 26. As will be apparent herein, the capacity of the spindle end 200 to be slidably moved axially along the arbor 192 enables the spindle 194 to be readily moved between its retracted, or out-of-the-way, position at which the spindle 194 does not obstruct the positioning of a spool 31 maneuvered into a cradled condition upon the frame 26 for support thereby and the extended position (depicted in solid lines in FIG. 13) at which the spindle 194 is accepted by an end of the barrel 31 of a spool cradled upon the frame 26 or, as mentioned earlier, by an end of an tube 196 which is positioned through the spool barrel 31.

To use the pallet 20, the pallet 20 is positioned upon the underlying floor 16 with its rail assemblies 32 disposed in the FIG. 7 closed condition, and then a spool 30 is maneuvered into its cradled condition upon the support surface 25 of the frame 26 so that the rims 41 of the discs 38, 39 of the spool 30 rest across of the sets 74, 80 of struts of the frame 26. When in the cradled condition, the barrel 31 of the spool 30 is arranged substantially normal to the longitudinal axis 15 of the frame 26, and the spool discs 38, 39 are each arranged in a substantially vertical plane. The spool 30 will commonly be maneuvered into place upon the frame 26 with a forklift truck 122, and the pallet 20 provides a user with the option of directing the spool 30 into place upon the frame 26 as the spool 30 is advanced across the frame 26 from an end thereof (as illustrated in FIG. 15) or directing the spool 30 into place upon the frame 26 as the spool 30 is advanced across the frame 26 from a side thereof (as is illustrated in FIG. 13). If the latter option is selected, one of the rail assemblies 32 will need to be pivoted about the leg 24a or 24c to which the rail assembly 32 is connected to pivotally move the rail assembly 32 to its (e.g. FIG. 8) out-of-the-way condition and to thereby provide access to the support surface 25 of the frame 26 over a side thereof.

With the spool 30 thereby positioned in a cradled (FIG. 5) condition upon the support surface 25 of the frame 26, the barrel 31 of the spool 30 is in condition for accepting the cooperating members 36 (i.e. the spindles 194) directed endwise toward each end of the barrel 31. It will be understood that the sets 74, 80 of struts are located along the length of the frame 26 (e.g. between the frame ends 56 and 60 so that a spool 30 which is cradled across these sets 74 and 80 of struts is substantially centered between the ends 56 and 58 of the frame 26. Meanwhile, the jack assemblies 34 are positioned between the ends 56 and 60 of the frame 26 so that the cooperating members 36, or spindles 194, are substantially centered between the frame ends 56 and 60. This being the case, each spindle 194 is supported by a carriage assembly 188 so as to be disposed along the vertical centerline of the barrel 31 of a spool 30 cradled upon the frame 26. To position each spindle 194 at about the same horizontal level as the longitudinal axis 43 of the spool barrel 31, each carriage assembly 188 is moved upwardly or downwardly, as necessary, with the jack apparatus 164 of a corresponding jack assembly 34 as the outer tube 162 is moved upwardly or downwardly along the length of the inner tube 160.

A characteristic of the spindles 194 is that they be capable of being positioned in cooperating relationship with the ends of a barrel 31 of a spool 30 cradled upon the frame 26 so that when the spool 30 is subsequently lifted by way of the jack assemblies 34, the weight of the spool 30 is borne by the spindles 194. If the spool 30 is wide enough (as measured between the discs 38, 39 thereof), the spindles 194 (once positioned at about the same horizontal level as the longitudinal axis 43 of the spool barrel 31) can be directed axially of the arbor 192 so that the ends 200 of the spindles 194 are accepted by the hollow interiors of the barrel ends. However and if the spool 30 is not very wide (i.e. so that the ends of the spool barrel 31 cannot be reached by the spindles 164, once the spindles 164 are moved to the FIG. 13 extended condition), a tube 196 (introduced earlier) having a length which is slightly shorter than the width of the frame 26 can be inserted through the barrel 31 of the spool 30 so that the spindles 194, once moved to the FIG. 13 extended, or solid-line, condition are accepted by the ends of the tube 196 so that when the spindles 194 are subsequently raised by the jack assemblies 34, the weight of the spool 30 is transferred to the spindles 194 by way of the tube 196.

The foregoing having been said and as used herein, the phraseology which calls for the positioning of a cooperating member 36 in cooperating relationship with the ends of the barrel 31 of a spool 30 is to be interpreted as either directing the cooperating member (or spindle 194) directly into an end of the barrel 31 of a spool 30 or directing the cooperating member 36, or spindle 194, into an end of a tube 196 which has previously been positioned through the barrel 31 of a spool 30.

With reference to FIGS. 16-18, there is shown the sequential steps involved in raising a spool 30 from a cradled condition upon the frame 26 to an elevated condition above the frame 26 at which the spool 30 is free to be rotated about its longitudinal axis 43. In particular and with reference to FIG. 16, there is shown a spool 30 being cradled upon the pallet support surface 25 and a tube 196 positioned through the spool barrel 31 so that the opposite ends of the tube 196 are disposed adjacent a corresponding spindle 194 associated with a jack assembly 34. Within this FIG. 16 view, both spindles 194 are disposed in the FIG. 13 retracted, or phantom-line, position so as not to obstruct the placement of the spool 30 upon the support surface 25.

The spindles 194 are thereafter moved endwise to the FIG. 13 extended, or solid-line, condition and therefore into the ends of the tube 196. With reference to FIG. 17, there is shown the disposition of the spindles 194 after being moved endwise when directed into the ends of the tube 196. That is to say, the spindles 194 are accepted by the opposite ends of the tube 196, and the tube 196, in turn, is accepted by the hollow interior of the barrel 31 of the spool 30. At that point, the spool 30 can be lifted by way of the jack assemblies 34 to, for example, the elevated condition of the spool 30 illustrated in FIG. 18 as the spindles 194 bear upwardly against the hollow interior of the tube 196 so that the rims 41 of the spool 30 are no longer in engagement with the sets 74, 89 of struts of the support surface 25. With the spool 30 thereby raised to the FIG. 18 elevated condition, the spool 30 is free to rotate (or be rotated) about its longitudinal axis 43 during a process involving the unwinding of the coil 33 of material from the barrel 31 of the spool 30 (as during a payoff process) or involving the winding of a coil 33 of material about the spool barrel 31.

It will be understand from the foregoing that the jack assemblies 34, 34 are adapted to move the spindles 194 upwardly or downwardly relative to the frame 26 along substantially vertical paths. Meanwhile, the center of the gaps, or spacings, between each set 74 or 80 of struts is located in a vertical plane which contains the vertical paths along which the spindles 194 are permitted to move (i.e. by way of the jack assemblies 34, 34). Therefore and when the spool 30 is positioned within the support surface 25, the sets 74, 80 of struts of the frame 26 effectively self-center the spool 30 or, more specifically, the barrel 31 of the spool 30, about the vertical paths of movement of the spindles 194. Thus, the arrangement of the spindles 194 relative to the struts 76, 78 and 82, 84 ensures that the longitudinal axis 43 of the spool barrel 31 is positioned in a vertical plane containing the longitudinal and rotational axis 198 of the spindles 194. This being the case and to facilitate the placement of the spindles 194 in a vertical position at which the spindle ends 200 are readily accepted by the ends of the spool barrel 31, the spindles 194 need only to be raised and lowered, as necessary, by the jack assemblies 34 to position the spindles 194 into axially-aligned registry with the spool barrel 31. Accordingly, the aforedescribed arrangement of the spindles 194 relative to the struts 76, 78 and 82, 84 facilitates the positioning of the spindles 194 in the desired cooperating relationship with the ends of the spool barrel 31 and is advantageous in this respect.

Preferably, the components of the frame 26 of the pallet 20 are comprised of steel which renders the pallet 20 strong enough to be lifted by way of a forklift truck 122 (such as is depicted in FIG. 17) as a spool 30 is cradled within the frame 26. Thus, a spool 30 can be readily transported from one site to another while the spool 30 is arranged upon the pallet 20, and if desired, the spool 30 can be held by the jack assemblies 34 in an elevated condition during a process involving the unwinding of the coil 33 of material at a jobsite while the pallet 20, in turn, is supported in an elevated condition by the forklift truck 122.

Figure 19:
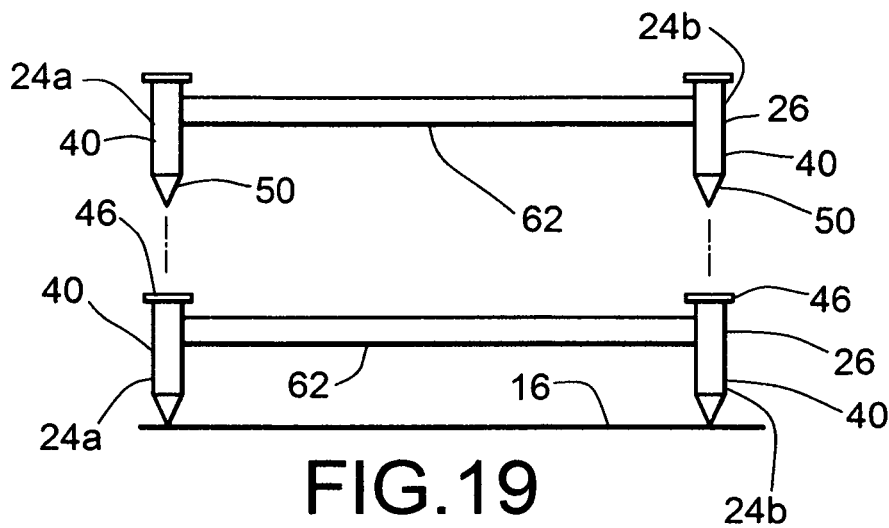
FIG. 19 is a side elevation view of the base of the FIG. 1 pallet and the base of a pallet of like construction being arranged in a superposed relationship for pallet-stacking purposes.

Another advantage provided by the pallet 20 relates to its capacity to be stacked with pallets of like construction. For example, there is depicted in FIG. 19 a pair of frames 26 (which are identical in construction to the frame 26 of the FIG. 1 pallet 20) arranged in a superposed relationship so that the pointed feet 50 of one (i.e. the higher) frame 26 are positioned in vertical registry with the hollow openings of the vertically-disposed sections 40 of the legs of the other (i.e. the lower) frame 26. By lowering the higher frame 26 onto the lower frame 26, the feet 50 are nestingly accepted by the vertically-disposed legs of the lower frame 26 so that the superposed frames 26, 26 are arranged in a stacked relationship.

Figure 20:
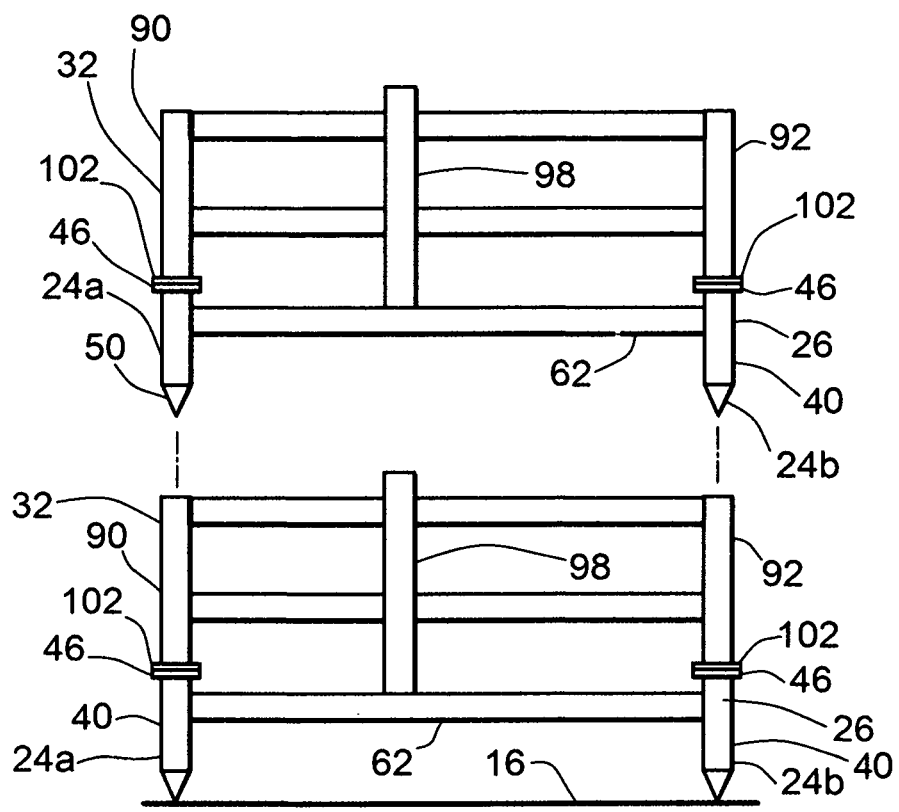
FIG. 20 is a side elevation view of the base and rail assemblies of the FIG. 1 pallet, shown with the jack assemblies removed therefrom, and the base and rail assemblies of a pallet of like construction being arranged in a superposed relationship for pallet-stacking purposes.

Similarly, there is depicted in FIG. 20 two pallets 20 (which are identical to the pallet 20 of FIG. 1) except that the jack assemblies 34 have been removed therefrom) arranged in a superposed relationship so that the pointed feet of one (i.e. the higher) pallet 20 are positioned in vertical registry with the hollow openings of the tubular end sections 90, 92 of the rail assemblies 32 of the other (i.e. the lower) pallet 20. By lowering the higher pallet 20 onto the lower pallet 20, the feet 50 of the higher pallet 20 are accepted by the tubular end sections 90, 92 of the lower pallet 20. It follows from the foregoing that the construction of the pallet 20 provides a user with a number of options for stacking the pallet 20 or its components (e.g. the frame 26 thereof) atop one another for storage purposes.

It follows that a pallet 20 has been described for supporting an item, such as a spool 30, for holding a coil 33 of windable material wherein the item, or spool 30, includes an elongated barrel 31 having two opposite ends and about which the material is wound or from which the material can be unwound and two discs 38, 39 wherein the discs 38, 39 are disposed at the two opposite ends of the barrel 31 and wherein each of the two discs 38, 39 has a rim 41 along the periphery thereof. The pallet 20 includes a floor-engaging base 22 including an elongated frame 26 having two opposite ends 56, 60, a longitudinal axis 15 and two opposite sides which extend between the two opposite ends 56, 60 of the frame 26. The frame 26 includes a support surface 25 within which a spool 30 can be cradled so that when cradled within the frame 26, the spool 30 is arranged so that the rims 41 of both discs 38, 39 rest across the support surface 25 and the barrel 31 of the spool 30 is oriented substantially parallel to the floor 16 (i.e. horizontally) and substantially normal to the longitudinal axis 15 of the frame 26.

The pallet 20 also includes a pair of carriage assemblies 188 wherein one carriage assembly 188 is arranged adjacent one side of the frame 26 and the other carriage assembly 188 is arranged adjacent the other side of the frame 26. Each carriage assembly 188 includes a cooperating member 26 which is cooperable with the barrel 31 of a spool 31 at a corresponding one of the two opposite ends of the spool barrel 31 so that when the spool 30 is cradled upon the support surface 25 as aforesaid and the cooperating member 36 of each carriage assembly 188 is positioned in cooperating relationship with a corresponding end of the barrel 31 of the spool 30, the spool 30 is in condition to be lifted from the support surface 25 with the carriage assemblies 188. A jack assembly 34 is interposed between each carriage assembly 188 and the frame 26 for raising the spool 30 from the support surface 25 by way of the cooperating members 36.

The method of the invention includes the steps involved in using the pallet 20. More specifically, the method includes the steps of providing the pallet 20, and then positioning a spool 30 upon the support surface 25 of the pallet frame 26 in a cradled condition therein so that the rims 41 of both discs 38, 39 rest across the support surface 25 so that the barrel 31 of the spool 30 is oriented substantially parallel to the floor 16 (i.e. horizontally) and substantially normal to the longitudinal axis 15 of the frame 26. The cooperating members 36 are then positioned into cooperating relationship with the barrel 31 of the spool 30 at each end thereof, and the jack assemblies 34 are used, or actuated, to raise the spool 30 from the support surface 25 by way of the cooperating members 36.

It will be understood that numerous modifications and substitutions can be had to the aforedescribed embodiment 20 without departing from the spirit of the invention. For example, although the aforedescribed pallet 20 has been shown and described as having floor-engaging feet 50 at the lower ends of the legs 24a, 24b, 24c and 24d, an alternative pallet which embodies features of the present invention can include floor-engaging wheels. For example, there is shown in FIG. 21 a pallet, generally indicated 220, having a frame 226 with four legs 224, and there is incorporated within each leg 224 a caster 230 having a floor-engaging wheel 232.

In addition, the pallet 220 includes a support surface 225 which is defined by the (upper surfaces of) two sets 250, 252 of elongated rollers 254, 256 and 258, 260 wherein the rollers 254, 256 of one set 250 are arranged in a parallel relationship and extend across a portion of the frame 226 from one side thereof and the rollers 258, 260 of the other set 252 are arranged in parallel relationship and extend across a portion of the frame 226 from the other side thereof. Each roller 254, 256, 258 or 280 is similar in construction to known conveyor rollers which include internal bearings enabling each roller to be rotated about a stationary, longitudinal axis. It follows that the support surface 225 of the FIG. 21 pallet 220 are defined by the outer surfaces of the rollers 254, 256, 258, 260 and enable a spool 30 which is cradled within the support surface 225 to be rotated about its longitudinal axis as the rims 41 of the spool 30 remain engaged with the outer surfaces of the rollers 254, 256, 258, 260.

Figure 21:
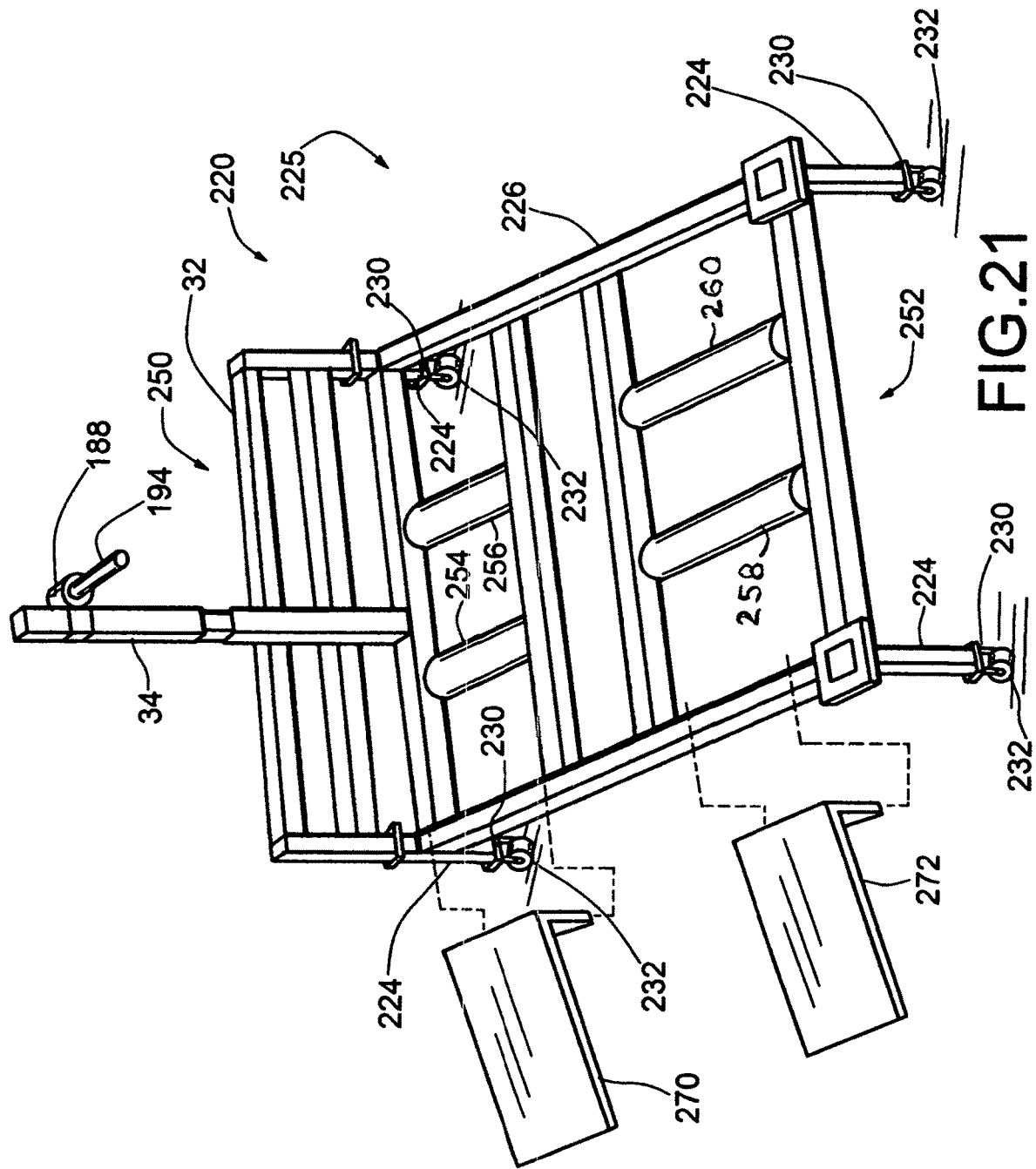
FIG. 21 is a perspective view similar to that of FIG. 1 of an alternative pallet apparatus, shown with one of its rail assemblies removed therefrom, and within which features of the present invention are embodied.

Further still, there is associated with the pallet 220 of FIG. 21 a pair of ramps 270, 272 which can be joined to the frame 226 adjacent one end thereof to permit a spool 30 (e.g. a spool whose barrel is devoid of a coil wound thereabout) to be rolled (e.g. manually) onto the frame 226 and into a cradled condition upon the support surface 225.

Yet still further and although the upper surfaces of the support surface 25 of the FIG. 1 pallet 20 within which the spool 30 can be cradled have been shown within the drawings as being coplanar with the upper surfaces of the rail members of the remainder of the frame 26, the upper surfaces of the support surface 25 upon which a spool 30 is adapted to rest can be disposed at an alternative elevation with respect to the upper surfaces of the rail members of the remainder of the frame 26. For example and for the purpose of cradling a spool which is devoid of discs at the opposite ends thereof (such as the earlier-mentioned roll of sheet steel), a spool-cradling support surface whose upper surfaces are disposed at a higher elevation than the upper surfaces of the rail members of the remainder of the frame may be preferred over that of the support surface 25 of the FIG. 1 pallet 20 to ensure that the rail members of the remainder of the frame do not interfere with the cradling function of the support surface.

Accordingly, the aforedescribed embodiment 20 is intended for the purpose of illustration and not as limitation.

The invention claimed is:

1. A spool-supporting pallet for supporting a spool for holding windable material wherein the spool includes an elongated barrel having two opposite ends and about which the material is wound and from which the material can be unwound, said pallet comprising:

an elongated frame having two opposite ends, two opposite sides which extend between the two opposite ends of the frame, and a longitudinal axis which extends through and is substantially perpendicular to each of the opposite sides of the frame, the frame including a support surface within which the spool can be cradled for support so that when cradled within the frame, the spool is arranged so that the barrel of the spool is oriented substantially horizontally and parallel to the longitudinal axis of the frame, and wherein the support surface includes a pair of cradle-defining parallel struts upon which the spool is positionable wherein the longitudinal axis of the frame is perpendicular to the longitudinal axis of each of the struts so that when the spool is cradled within the support surface, the longitudinal axis of the frame is perpendicular to the longitudinal axis of the spool and the longitudinal axis of the spool is parallel to the struts;

a cooperating member which is mounted upon the frame adjacent one side thereof and inboard of the pair of cradle-defining struts, and wherein the cooperating member is cooperable with the barrel of the spool at one of the two opposite ends of the barrel so that when the spool is cradled upon the support surface as aforesaid and the cooperating member is positioned in cooperating relationship with one of the two opposite ends of the barrel of the spool, the barrel of the spool is oriented substantially perpendicular to the longitudinal axis of the frame and said one barrel end is in condition to be lifted from the support surface with the cooperating member; and a jack assembly which is interposed between the cooperating member and the frame for raising the cooperating member with respect to the frame so that after positioning the cooperating member in cooperating relationship with one end of the barrel of the spool cradled upon the support surface as aforesaid, said one end of the spool can be lifted from the support surface of the frame by way of the jack assembly.

2. The pallet as defined in claim 1 wherein the cooperating member is supported by the jack assembly for upward or downward movement relative to the frame along a substantially vertical path disposed to one side of the frame, and the support surface is adapted to cradle the spool placed downwardly therein so that the longitudinal axis of the spool barrel is arranged in a vertical plane which contains the substantially vertical path of movement of the cooperating member to facilitate the positioning of the cooperating member in cooperating relationship with one of the ends of the barrel of the spool.

3. The pallet as defined in claim 1 wherein the cradle-defining struts of the support surface include at least one pair of parallel and spaced-apart struts which extend transversely of the longitudinal axis of the frame.

4. The pallet as defined in claim 1 wherein the barrel of the spool has an opening which is disposed substantially centrally of the spool;

the cooperating member includes an elongated component which is rotatably mounted upon the jack assembly for rotation relative thereto about an axis which is arranged substantially horizontally; and wherein the rotatable component is adapted to be accepted by the opening of the barrel of the spool when the rotatable component is directed therein so that upon acceptance of the rotatable component by the opening of the barrel of the spool, the cooperating member is positioned in cooperating relationship with the barrel of the spool at one of the two opposite ends of the spool.

5. The pallet as defined in claim 1 wherein the jack assembly includes telescoping inner and outer tubes which are supported adjacent one side of the frame in a substantially vertical orientation, the inner tube is joined in a fixed relationship with respect to the frame and the outer tube is movable upwardly or downwardly along the length of the inner tube, and the pallet further includes a carriage assembly which is fixedly secured upon the outer tube for movement therewith and includes a body, and the cooperating member is rotatably mounted within the body of the carriage assembly for sliding movement relative thereto between an extended condition at which a portion of the cooperating member is accepted by the opening disposed centrally of the barrel of the spool and a retracted condition at which the cooperating member is withdrawn from the barrel opening.

6. The pallet as defined in claim 4 wherein the carriage assembly and the jack assembly are movable in unison with respect to the frame between a first position at which the carriage assembly and the jack assembly are disposed adjacent one side of the frame and a second, out-of-the-way position which provides access to the support surface of the frame from the one side of the frame.

7. The pallet as defined in claim 6 further comprising an elongated rail assembly which is associated with and is joined to the frame along one side thereof for pivotal movement relative to the frame between one condition at which the rail assembly extends along the one side of the frame and a second condition, and the jack assembly and the cooperating member are connected to and supported by the rail assembly so that pivotal movement of the rail assembly relative to the frame between the first and second conditions moves the carriage assembly and the jack assembly between the first and second positions.

8. The pallet as defined in claim 7 further including means for releasably locking the rail assembly to the frame in the first condition.

* * * * *